US012656479B2

(12) United States Patent
Hazawa et al.

(10) Patent No.: US 12,656,479 B2
(45) Date of Patent: Jun. 16, 2026

(54) SECURITY INSPECTION SYSTEM

(71) Applicant: KABUSHIKI KAISHA TOSHIBA, Tokyo (JP)

(72) Inventors: Honoka Hazawa, Yokohama Kanagawa (JP); Hiroki Mori, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 239 days.

(21) Appl. No.: 18/454,825

(22) Filed: Aug. 24, 2023

(65) Prior Publication Data

US 2024/0201364 A1      Jun. 20, 2024

(30) Foreign Application Priority Data

Dec. 15, 2022      (JP) ................................. 2022-200541

(51) Int. Cl.
| | |
|---|---|
| *G01S 13/88* | (2006.01) |
| *G01S 13/86* | (2006.01) |
| *G01S 13/89* | (2006.01) |
| G01S 13/04 | (2006.01) |
| G01S 13/06 | (2006.01) |

(52) U.S. Cl.
CPC .......... *G01S 13/887* (2013.01); *G01S 13/867* (2013.01); *G01S 13/89* (2013.01); *G01S 13/04* (2013.01); *G01S 13/06* (2013.01)

(58) Field of Classification Search
CPC ...... G01S 13/887; G01S 13/89; G01S 13/867; G01S 13/04; G01S 13/06
USPC ...................................................... 342/22, 27
See application file for complete search history.

(56) References Cited

U.S. PATENT DOCUMENTS

| | | | | |
|---|---|---|---|---|
| 8,253,620 | B2 * | 8/2012 | Wise ....................... | G01S 13/90 |
| | | | | 342/25 A |
| 9,562,969 | B2 * | 2/2017 | Wang .................... | G01S 13/887 |
| 10,222,467 | B2 * | 3/2019 | Loannidis ............. | G01S 13/887 |

(Continued)

FOREIGN PATENT DOCUMENTS

| | | |
|---|---|---|
| CN | 112379372 A | 2/2021 |
| JP | 2019109709 A | 7/2019 |

(Continued)

OTHER PUBLICATIONS

Extended European Search Report (EESR) dated Feb. 28, 2024, issued in counterpart European Application No. 23193686.5.

(Continued)

*Primary Examiner* — Chuong P Nguyen
(74) *Attorney, Agent, or Firm* — Holtz, Holtz & Volek PC

(57) ABSTRACT

According to one embodiment, a security inspection system includes a plurality of antennas configured to transmit a radio wave and receive a reflected wave, and a processor configured to collect received data based on the reflected wave and perform a security inspection on a target based on the received data. The processor is configured to acquire region information regarding a region of a target based on information recognized by a sensor, generate first or second instruction information based on the region information, collect received data based on a reflected wave received by a part of the antennas set based on the first instruction information, perform a security inspection on a part of the received data set based on the second instruction information.

13 Claims, 17 Drawing Sheets

(56)  References Cited

U.S. PATENT DOCUMENTS

| | | | | |
|---|---|---|---|---|
| 10,295,664 B2 * | 5/2019 | Valdes | .................. | G01S 13/003 |
| 10,338,214 B2 * | 7/2019 | Ellenbogen | ........... | G01S 13/887 |
| 10,816,658 B2 * | 10/2020 | Frizzell | .................... | H01Q 3/34 |
| 11,231,498 B1 * | 1/2022 | Valdes Garcia | ........ | G01S 7/411 |
| 11,774,580 B2 * | 10/2023 | Valdes Garcia | ....... | G06V 10/25 |
| | | | | 382/103 |
| 11,815,648 B2 * | 11/2023 | Obata | .................... | G01V 8/005 |
| 12,529,779 B2 * | 1/2026 | Tsujimura | ................. | G01S 7/03 |
| 2014/0168013 A1 | 6/2014 | Wang et al. | | |
| 2016/0291148 A1 | 10/2016 | Ellenbogen et al. | | |
| 2019/0188456 A1 | 6/2019 | Shibata et al. | | |
| 2020/0064784 A1 * | 2/2020 | Steiner | .................. | G06V 10/25 |
| 2020/0393594 A1 | 12/2020 | Obata et al. | | |
| 2021/0325561 A1 | 10/2021 | Zhao et al. | | |
| 2022/0026561 A1 | 1/2022 | Valdes Garcia et al. | | |
| 2022/0107407 A1 | 4/2022 | Zhu et al. | | |
| 2023/0350093 A1 * | 11/2023 | Mori | ........................ | G01S 13/86 |
| 2024/0103155 A1 * | 3/2024 | Tsujimura | ................. | G01S 7/03 |
| 2024/0319215 A1 * | 9/2024 | Sekiya | ............. | G01N 35/00603 |

FOREIGN PATENT DOCUMENTS

| | | | |
|---|---|---|---|
| JP | 2020204513 A | 12/2020 | |
| JP | 2022059335 A | 4/2022 | |
| WO | 2022044187 A1 | 3/2022 | |

OTHER PUBLICATIONS

Japanese Office Action (and an English language translation thereof) dated Mar. 31, 2026, issued in counterpart Japanese Application No. 2022-200541.

* cited by examiner

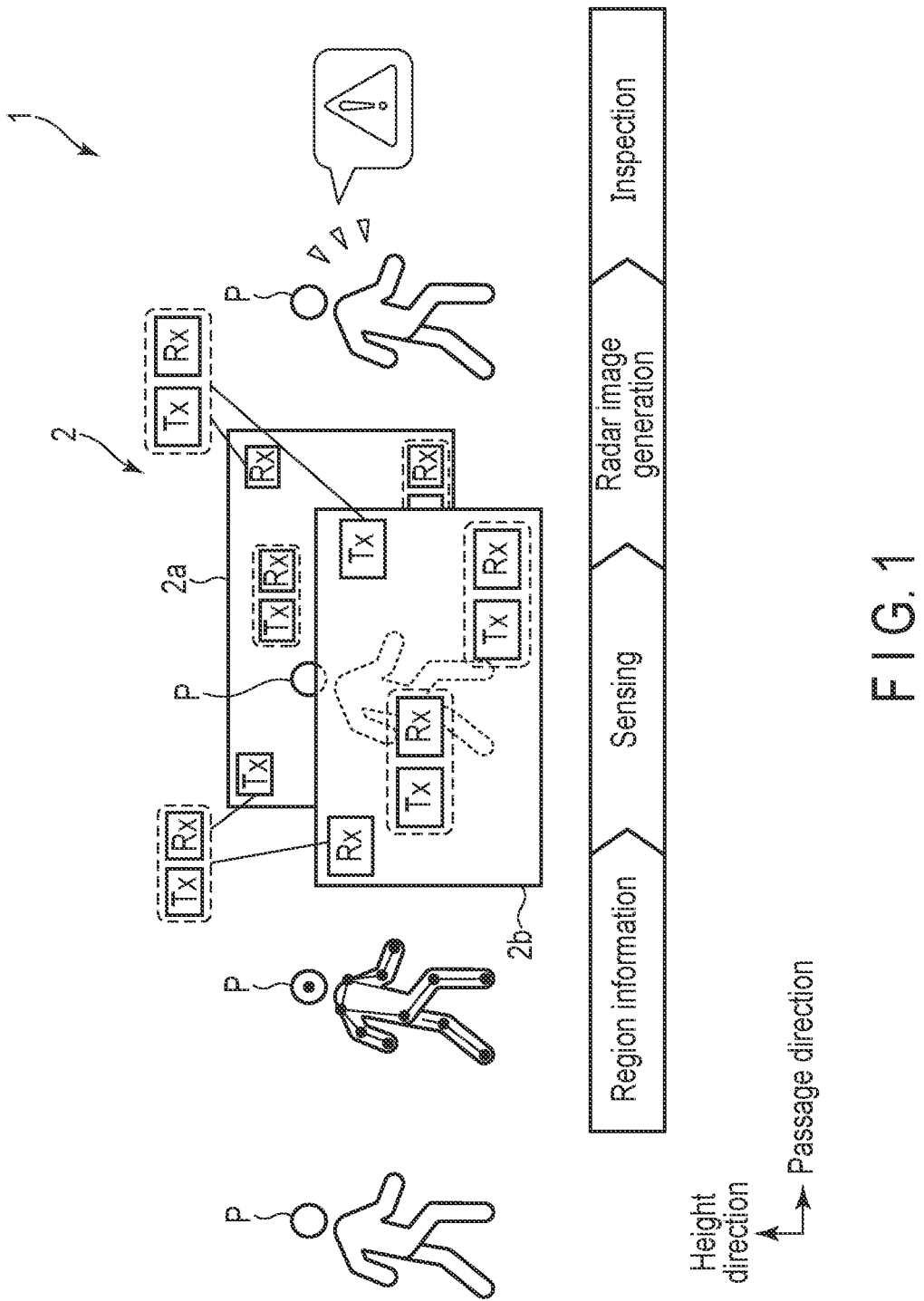
F I G. 1

1
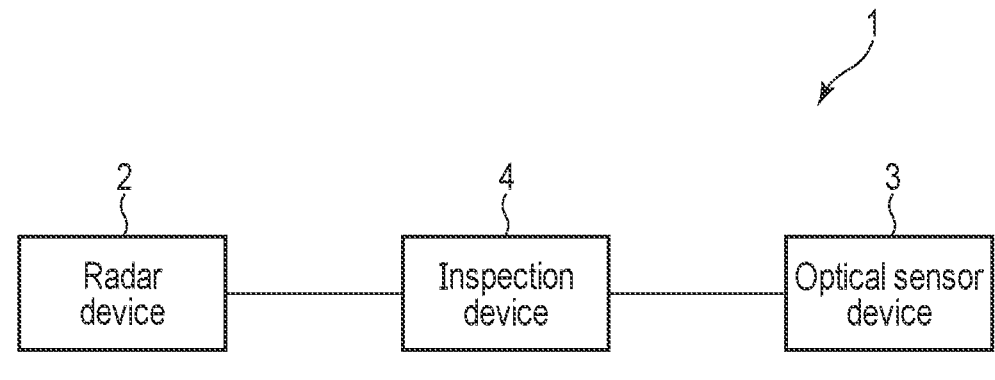
2              4              3
| Radar device | Inspection device | Optical sensor device |
F I G. 2
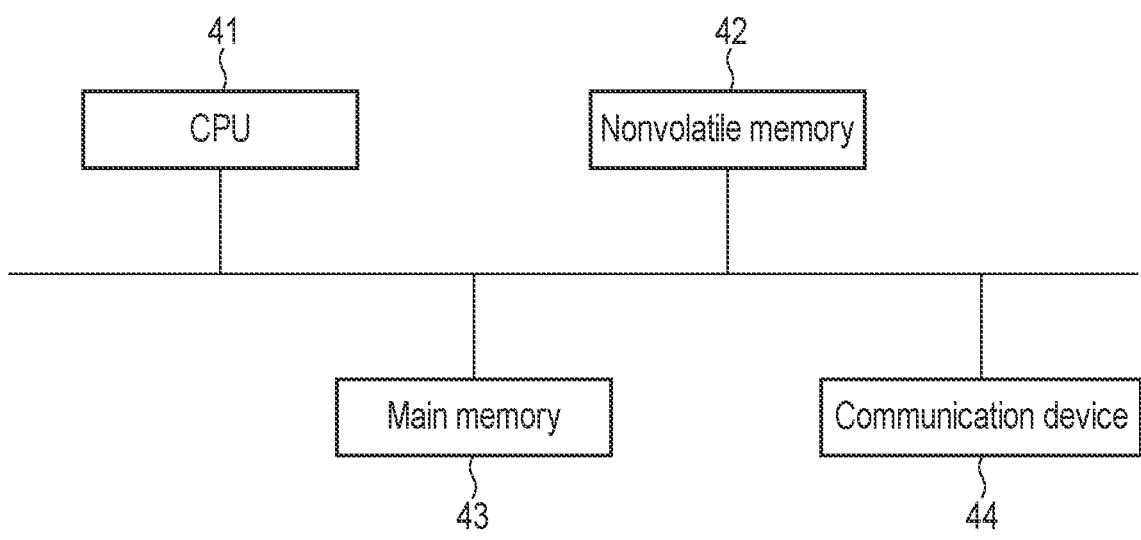
41              42
| CPU | Nonvolatile memory |
| Main memory | Communication device |
43              44
F I G. 3

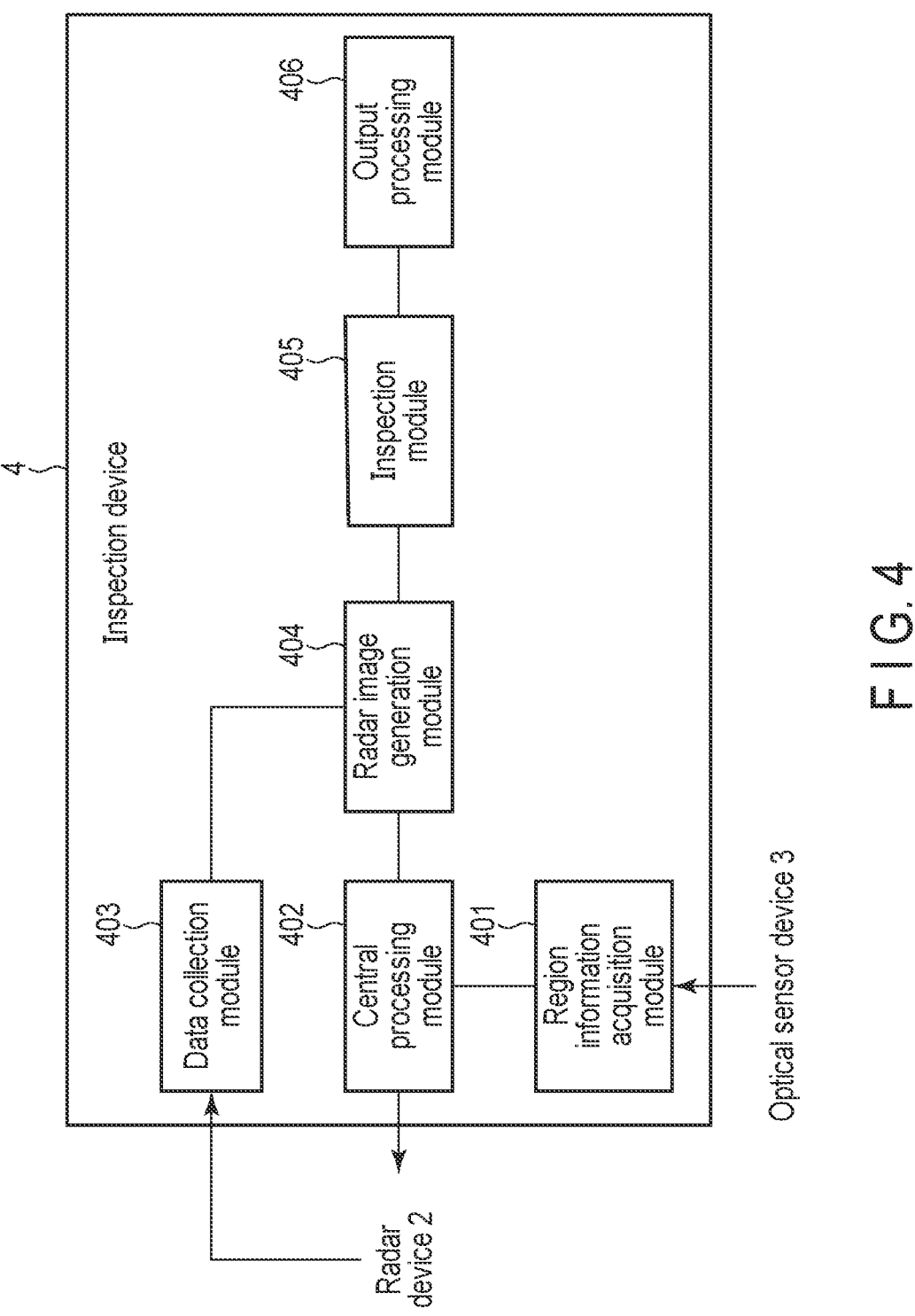
F I G. 4

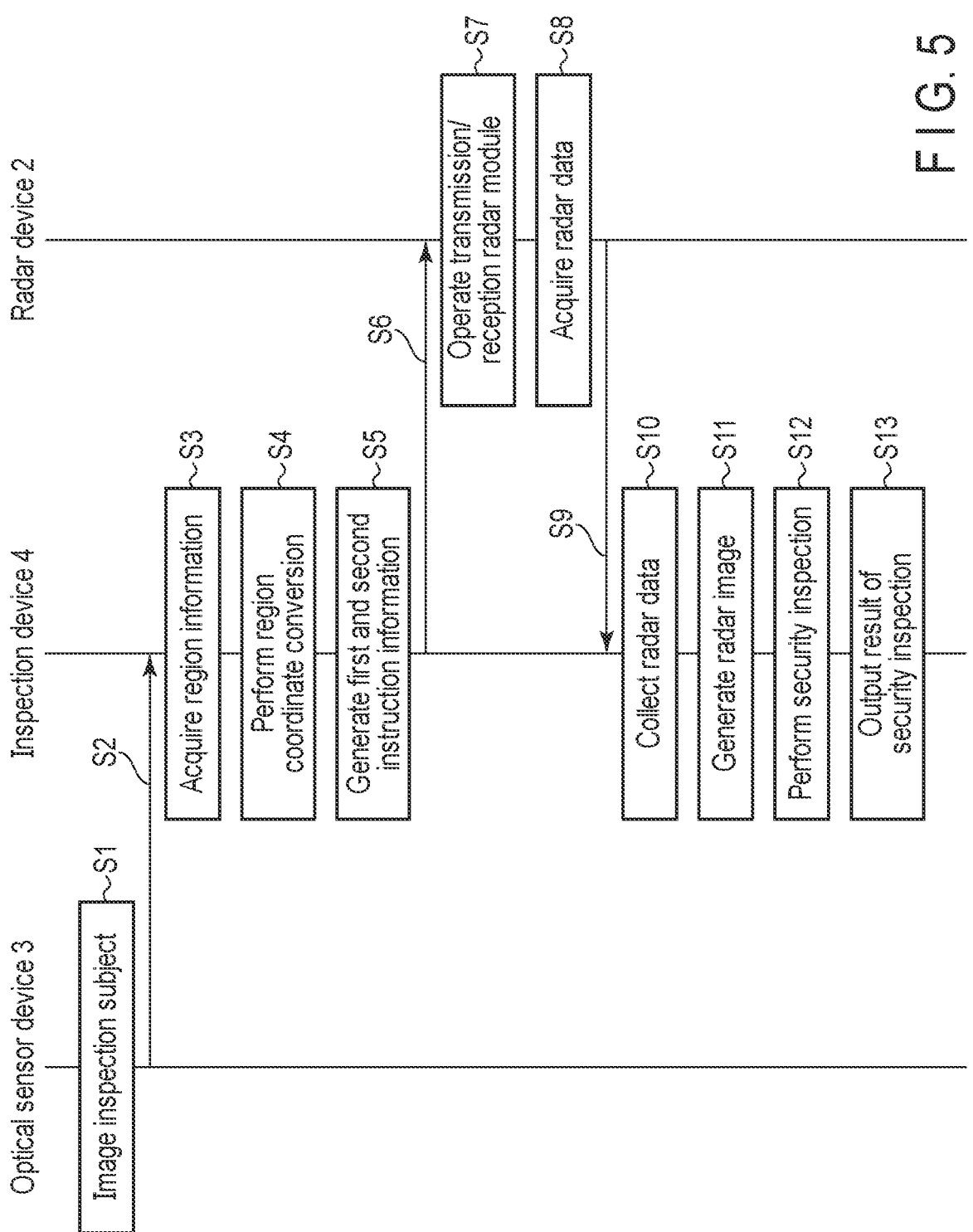
F I G. 5

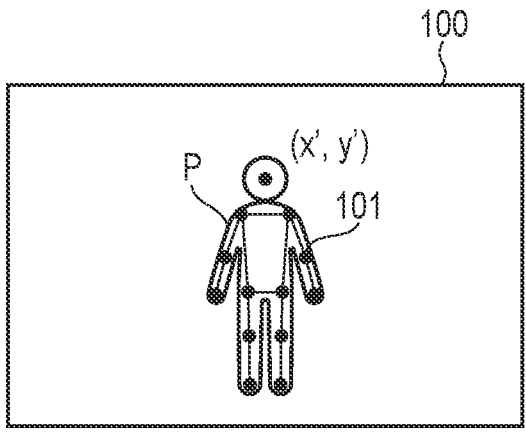
F I G. 6
| Region | X coordinate value | Y coordinate value |
|---|---|---|
| Region A | $x_a'$ | $y_a'$ |
| ... | ... | ... |
F I G. 7

Global coordinate value
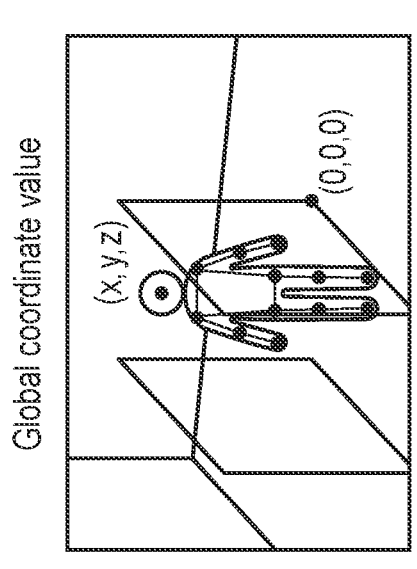
| Region | X coordinate value | Y coordinate value | Z coordinate value |
|---|---|---|---|
| Region A | $x_a$ | $y_a$ | $z_a$ |
| ... | ... | ... | ... |
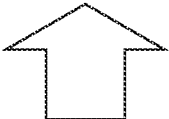
Camera coordinate value
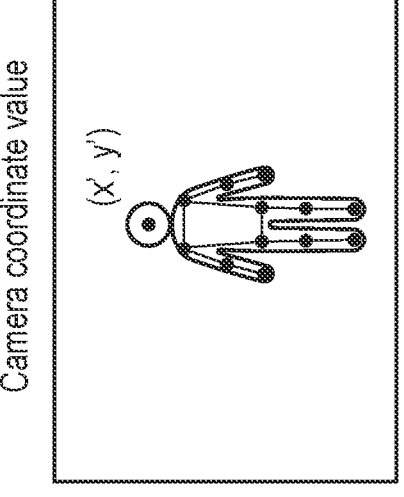
| Region | X coordinate value | Y coordinate value |
|---|---|---|
| Region A | $x_a'$ | $y_a'$ |
| ... | ... | ... |
F I G. 8

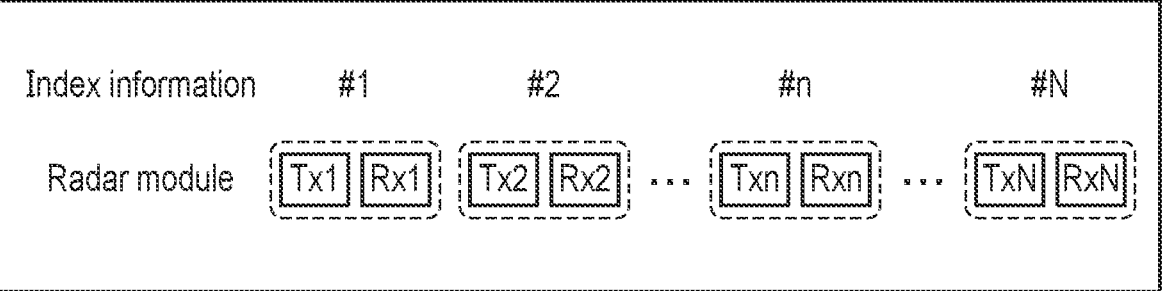
F I G. 9

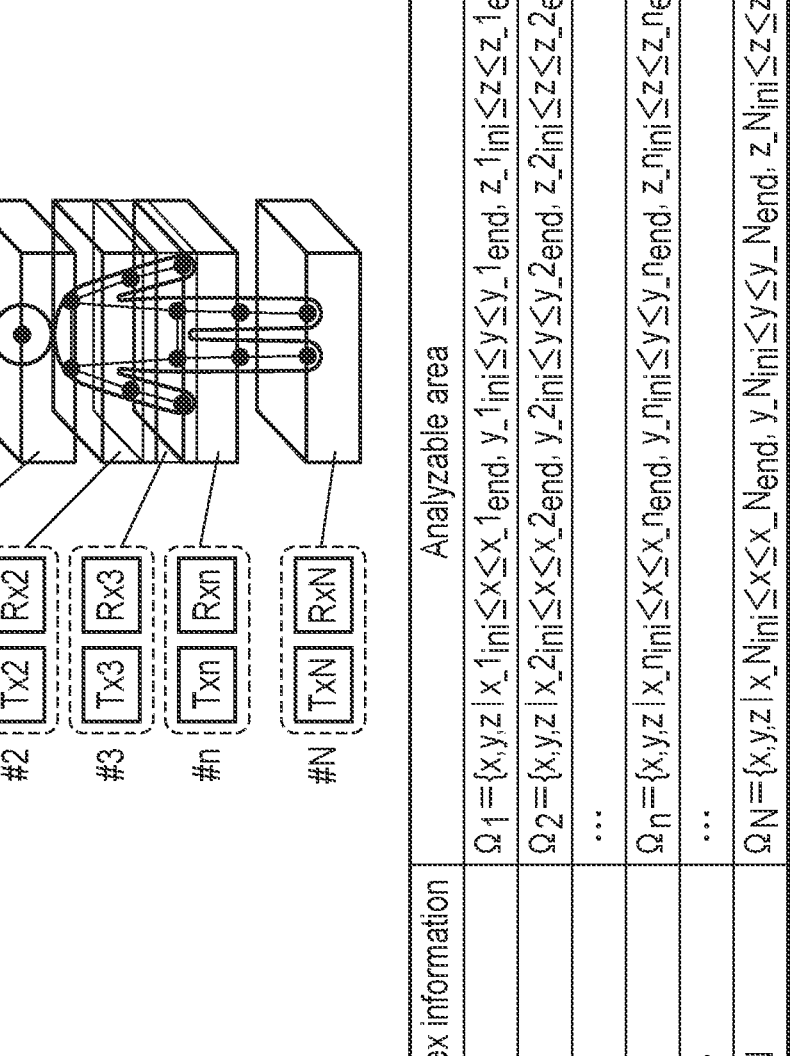

| Index information | Analyzable area |
|---|---|
| #1 | $\Omega_1 = \{x,y,z \mid x\_1ini \leq x \leq x\_1end,\ y\_1ini \leq y \leq y\_1end,\ z\_1ini \leq z \leq z\_1end\}$ |
| #2 | $\Omega_2 = \{x,y,z \mid x\_2ini \leq x \leq x\_2end,\ y\_2ini \leq y \leq y\_2end,\ z\_2ini \leq z \leq z\_2end\}$ |
| ... | ... |
| #n | $\Omega_n = \{x,y,z \mid x\_nini \leq x \leq x\_nend,\ y\_nini \leq y \leq y\_nend,\ z\_nini \leq z \leq z\_nend\}$ |
| ... | ... |
| #N | $\Omega_N = \{x,y,z \mid x\_Nini \leq x \leq x\_Nend,\ y\_Nini \leq y \leq y\_Nend,\ z\_Nini \leq z \leq z\_Nend\}$ |

F I G. 10

| Region (global coordinate) | Proper area | Index information |
|---|---|---|
| Region A $(x_a, y_a, z_a)$ | $(x_a, y_a, z_a) \in \Omega_A$ | #A |
| Region B $(x_b, y_b, z_b)$ | $(x_b, y_b, z_b) \in \Omega_B$ | #B |
| Region C $(x_c, y_c, z_c)$ | $(x_c, y_c, z_c) \in \Omega_C$ | #C |
| Region D $(x_d, y_d, z_d)$ | $(x_d, y_d, z_d) \in \Omega_D$ | #D |
F I G. 11
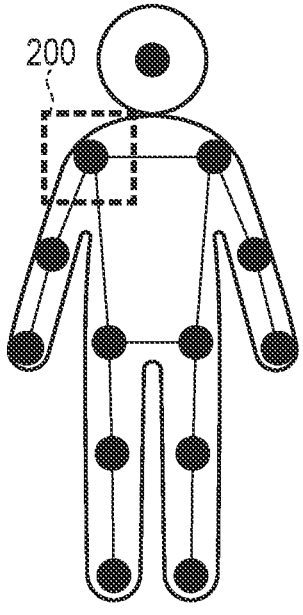
F I G. 12

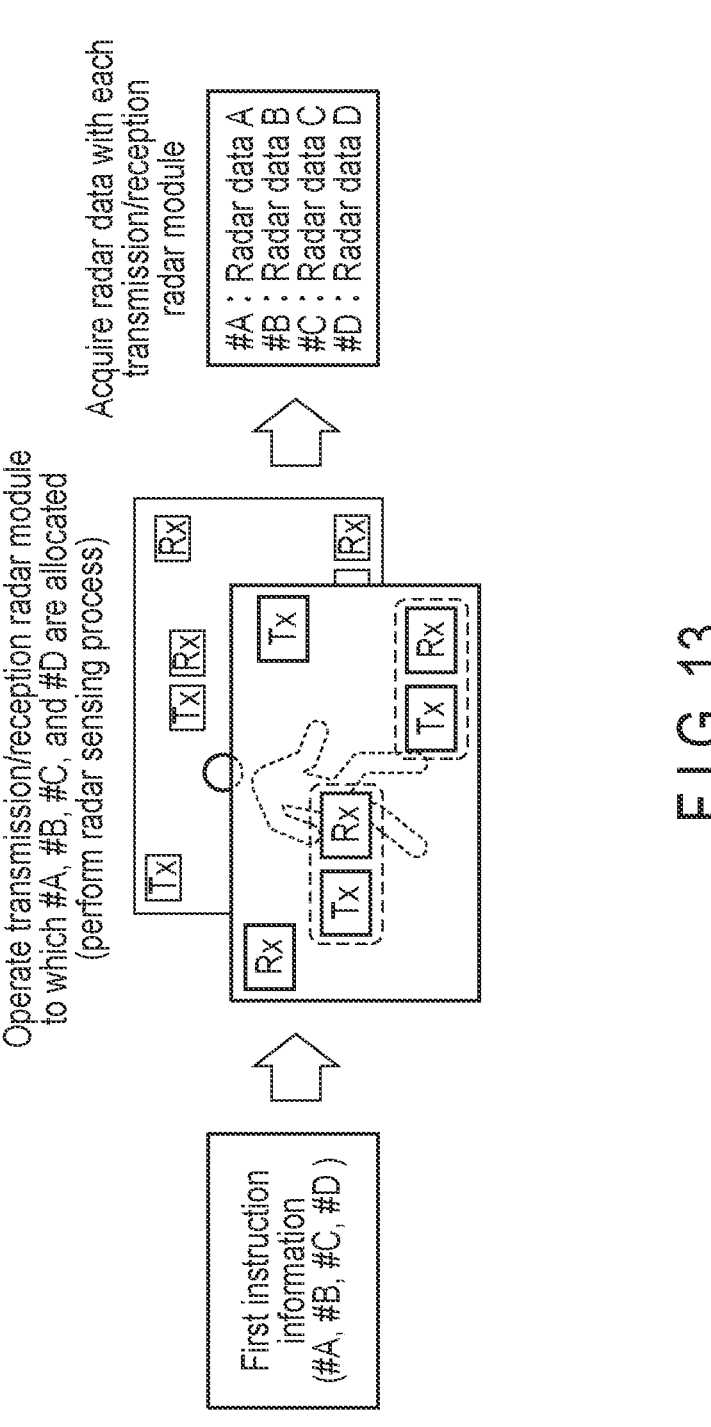
F I G. 13

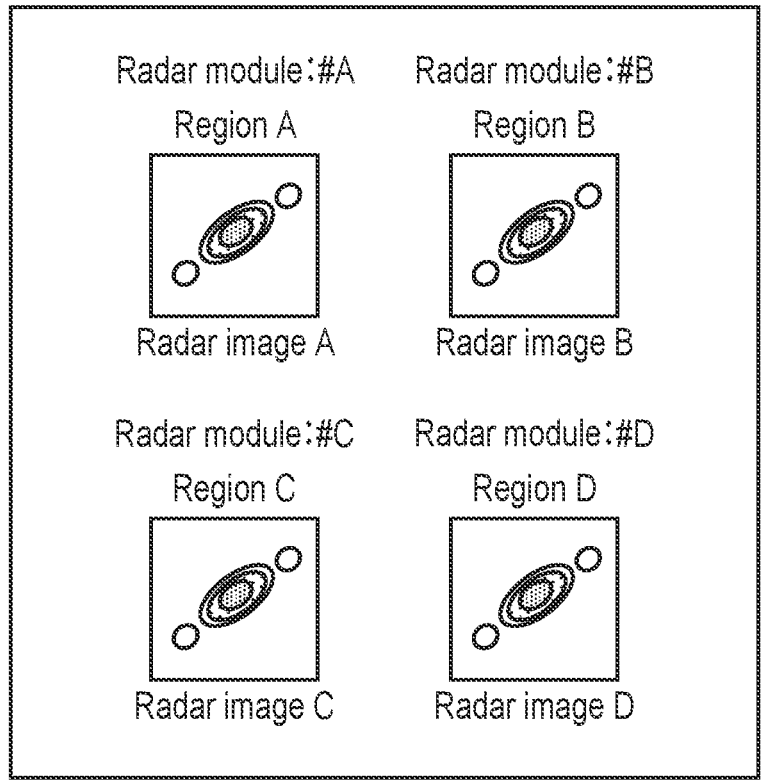
F I G. 14

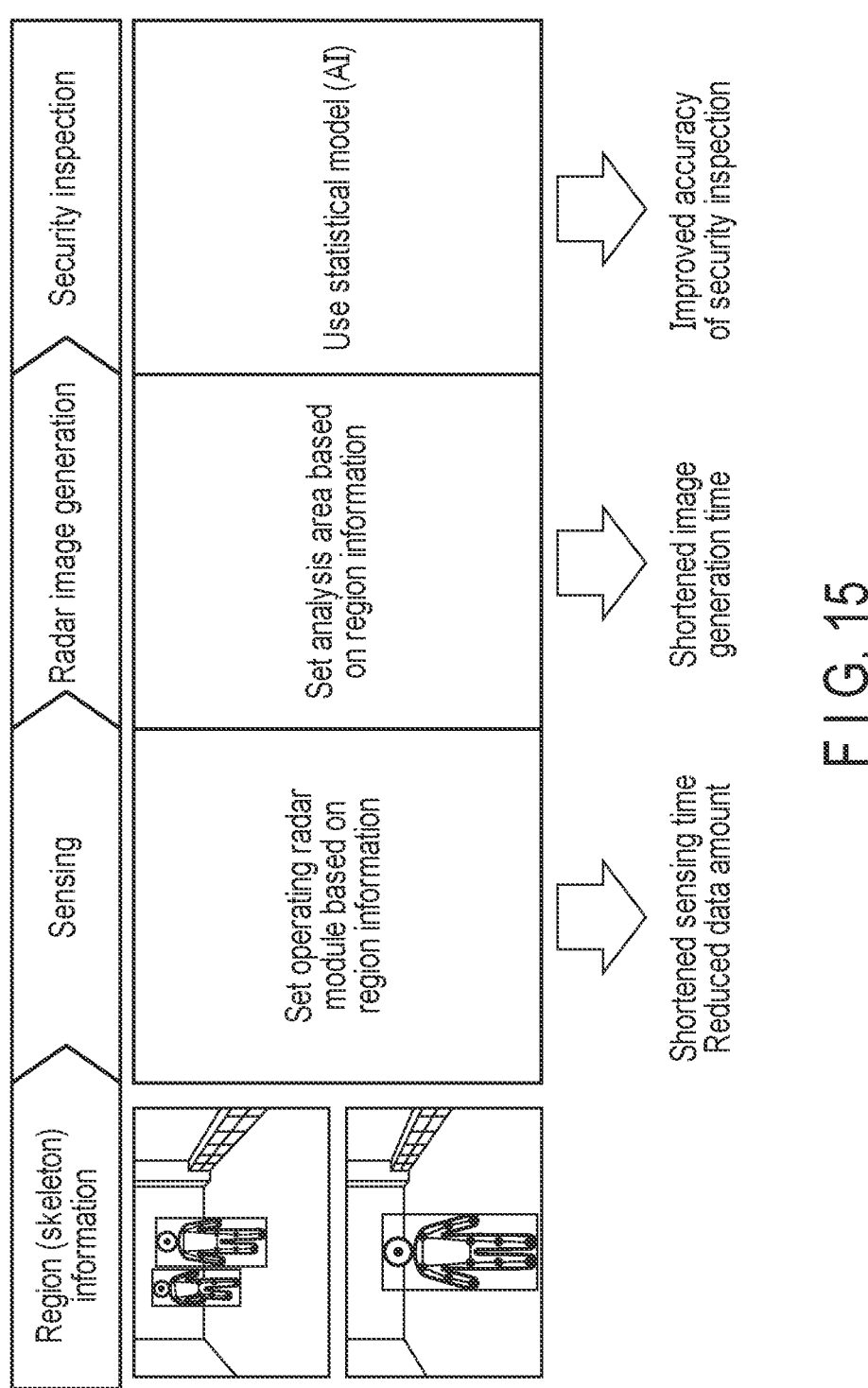
F I G. 15

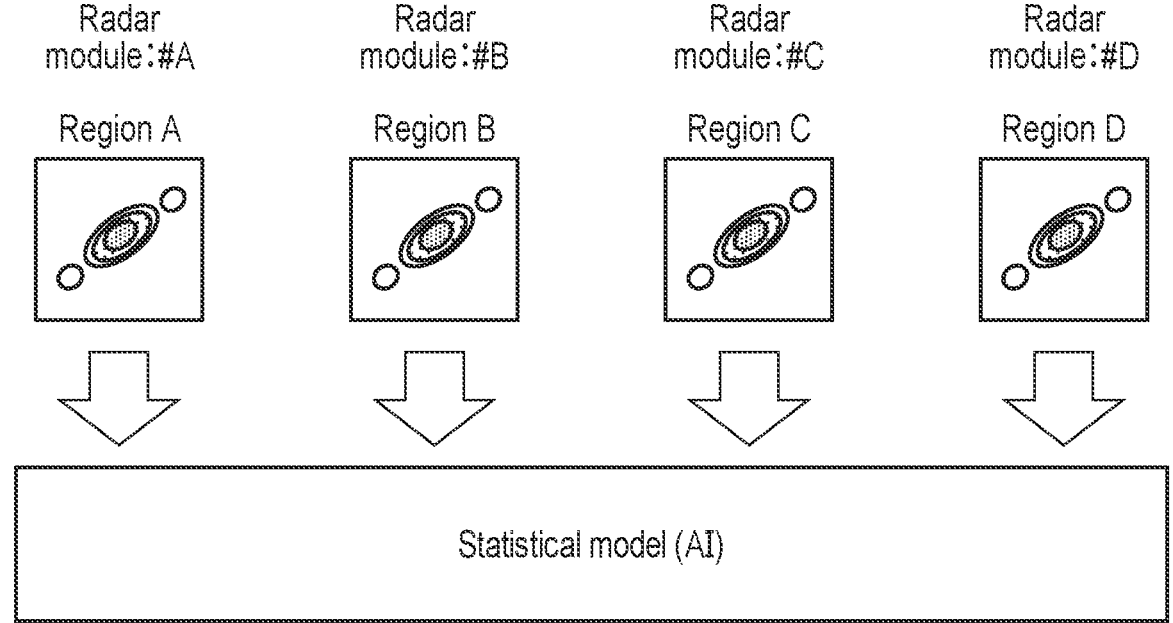
Carry hazard in region A
F I G. 16

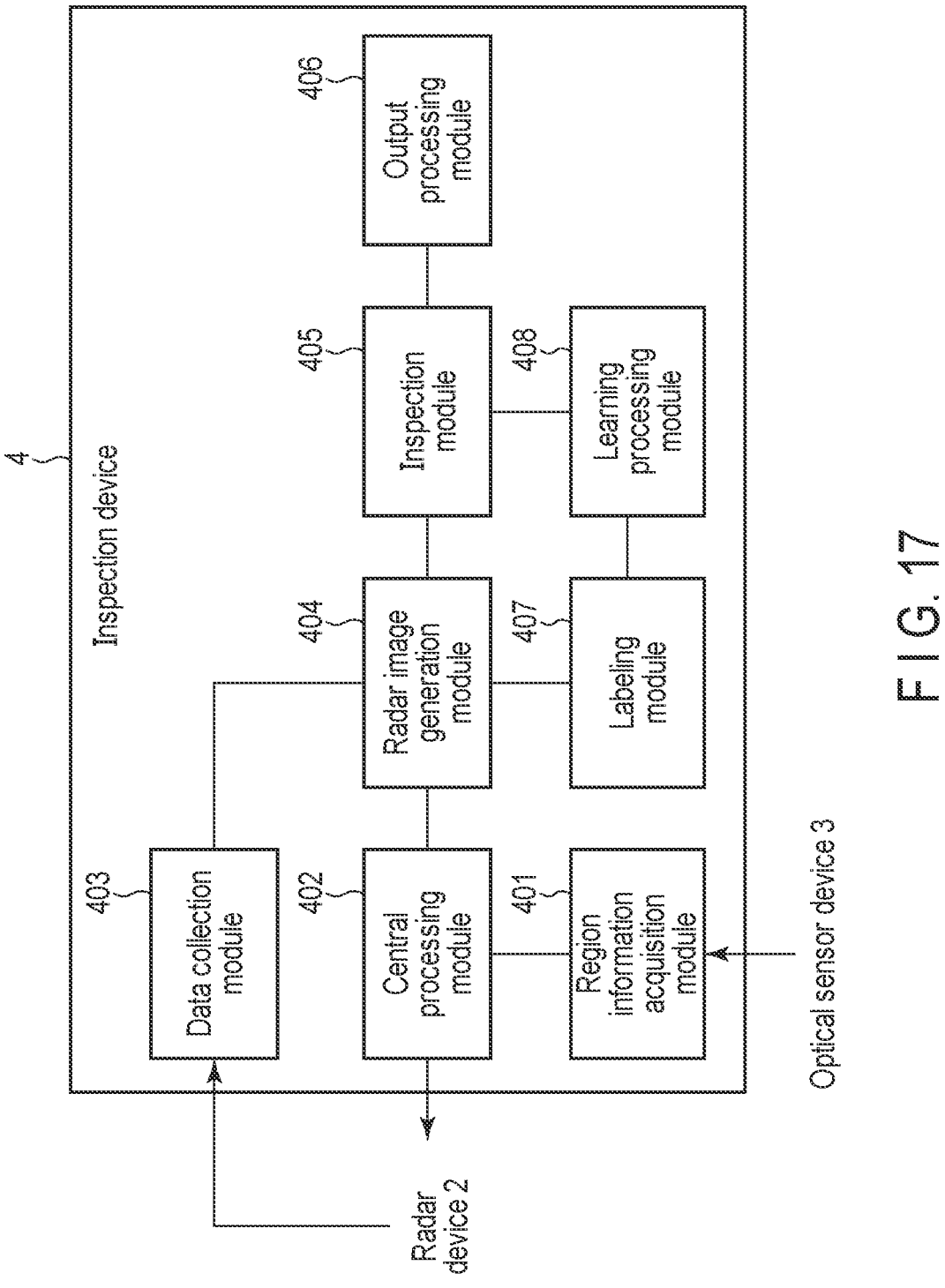
F I G. 17

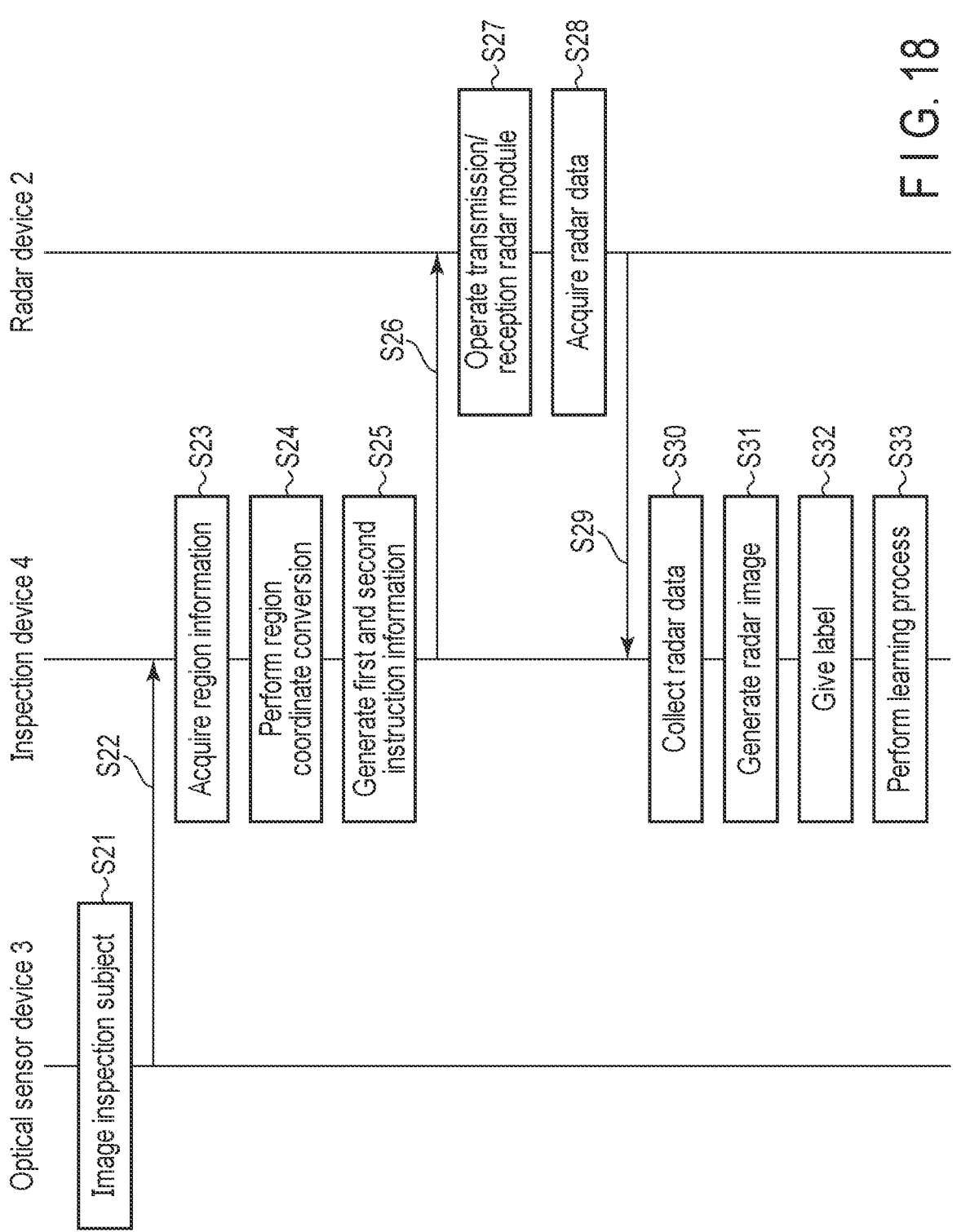
F I G. 18

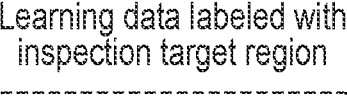
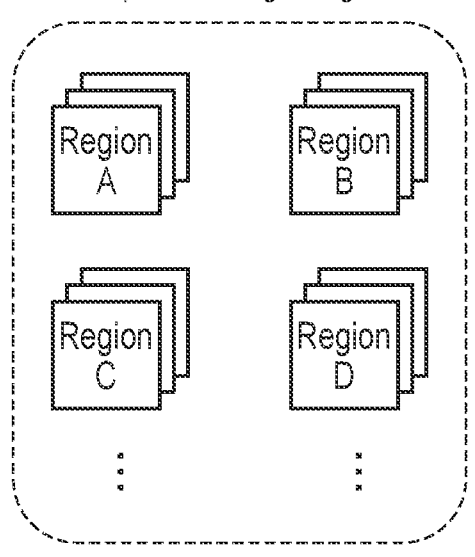
F I G. 19

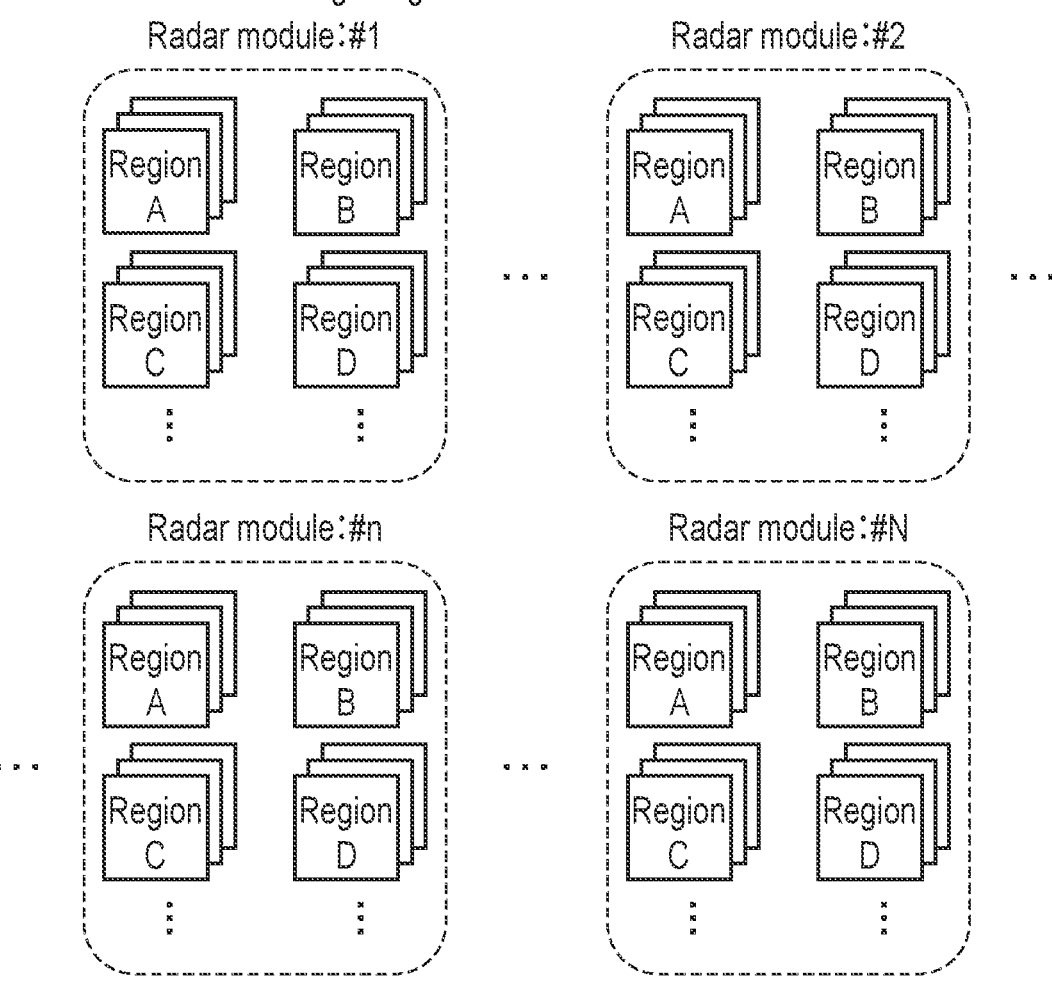
F I G. 20

SECURITY INSPECTION SYSTEM

CROSS-REFERENCE TO RELATED APPLICATIONS

This application is based upon and claims the benefit of priority from Japanese Patent Application No. 2022-200541, filed Dec. 15, 2022, the entire contents of which are incorporated herein by reference.

FIELD

Embodiments described herein relate generally to a security inspection system.

BACKGROUND

In recent years, a security inspection system using a radar device has been developed. In this security inspection system, for example, by transmitting (emitting) a radio wave to a target (specifically, an object or a subject), a reflected wave from the target can be received, and the target can be inspected (that is, the security inspection is performed on the object) based on the radar data based on the received reflected wave.

However, in a case where a security inspection is performed on a pedestrian or the like, for example, the security inspection needs to be efficiently performed.

BRIEF DESCRIPTION OF THE DRAWINGS

FIG. 1 is a diagram for describing an overview of an operation of a security inspection system according to an embodiment.

FIG. 2 is a diagram illustrating an example of a system configuration of the security inspection system.

FIG. 3 is a diagram illustrating an example of a hardware configuration of an inspection device.

FIG. 4 is a block diagram illustrating an example of a functional configuration of the inspection device.

FIG. 5 is a sequence chart illustrating an example of a processing procedure of the security inspection system when a security inspection is performed on an inspection target person.

FIG. 6 is a diagram for describing an overview of processing of acquiring region information.

FIG. 7 is a diagram illustrating an example of a data structure of region information.

FIG. 8 is a diagram for describing an overview of a region coordinate conversion.

FIG. 9 is a diagram illustrating an overview of index information included in prior information.

FIG. 10 is a diagram illustrating an overview of analyzable area information included in prior information.

FIG. 11 is a diagram for describing an overview of a first instruction information generation process.

FIG. 12 is a diagram for describing an overview of a second instruction information generation process.

FIG. 13 is a diagram illustrating an overview of a radar sensing process in a radar device.

FIG. 14 is a diagram illustrating an example of a radar image.

FIG. 15 is a diagram for explaining an overview of an efficient security inspection realized in the present embodiment.

FIG. 16 is a diagram illustrating an overview of a security inspection using a statistical model.

FIG. 17 is a block diagram illustrating an example of a functional configuration of an inspection device according to a modification of the present embodiment.

FIG. 18 is a sequence chart illustrating an example of a processing procedure of the security inspection system in a case where a statistical model is learned.

FIG. 19 is a diagram conceptually illustrating radar images labeled as inspection target regions.

FIG. 20 is a diagram conceptually illustrating radar images labeled with inspection target regions and index information.

DETAILED DESCRIPTION

In general, according to one embodiment, a security inspection system includes a plurality of antennas configured to transmit a radio wave to a target and receive a reflected wave from the target, and a processor configured to collect received data based on the reflected wave and perform a security inspection on the target based on the received data. The processor is configured to acquire region information regarding a region of a target based on information recognized by a sensor that acquires the information of the target, generate first or second instruction information based on the acquired region information, collect received data based on a reflected wave received by a part of the antennas set based on the first instruction information when the first instruction information is generated, perform a security inspection on a part of the received data set based on the second instruction information when the second instruction information is generated.

Various embodiments will be described with reference to the accompanying drawings.

The security inspection system according to the present embodiment is configured to perform a security inspection on a target based on radar data (also referred to as observation data observed by a radar device or received data) obtained by using a radar device including a plurality of antennas configured to transmit a radio wave to a target and receive a reflected wave from the target.

Note that, although it is assumed that the target is a person passing through a predetermined area, an article possessed by the person, or the like in the present embodiment, such a target may be, for example, a package in which an article is packed, an article packed in the package, or the like. In the following description, it is assumed that a target is a person (hereinafter, referred to as an inspection target person).

First, an overview of an operation of a security inspection system according to the present embodiment will be described with reference to FIG. 1. The security inspection system 1 (including a radar device 2 to be used) according to the present embodiment is installed in a facility at an airport, a station, a shopping mall, a concert hall, or an exhibition hall, for example, and is used as a hazard detection system that performs a security inspection as to whether an inspection subject P moving near the radar device 2 is carrying a predetermined object (for example, a hazard).

The security inspection system 1 according to the present embodiment operates to acquire region information about a region of the inspection subject P, perform a radar sensing process (that is, transmission of a radio wave to the inspection subject P and reception of a reflected wave from the inspection subject P) on the inspection subject P by using the radar device 2, generate a radar image including the inspection subject P based on radar data (radar data based on a reflected wave from the inspection subject P) collected by performing the radar sensing process, and perform a security inspection (recognition of whether the inspection subject P is carrying a hazard) based on the radar image.

That is, the security inspection system 1 according to the present embodiment provides a mechanism for realizing efficient security inspections by using a region (region information) of the inspection subject P in each phase of sensing, radar image generation, and security inspection.

Note that, in the security inspection system 1 according to the present embodiment, for example, it is assumed that a security inspection is performed on the moving (walking) inspection subject P, and the radar device 2 used in the security inspection system 1 includes a plurality of panels 2a and 2b arranged to sandwich the space in which the inspection subject P is moving. That is, the security inspection system 1 can perform a security inspection on the inspection subject P passing though the space between the plurality of panels 2a and 2b.

In each of the plurality of panels 2a and 2b, a plurality of transmitting radar modules Tx including a transmitting antenna that transmits a radio wave to the inspection subject P passing through the space between the plurality of panels 2a and 2b and a plurality of receiving radar modules Rx including a receiving antenna that receives a reflected wave from the inspection subject P are arranged. Note that the plurality of panels 2a and 2b may not be panels and may be in the form of struts, gates, or the like.

The transmitting radar modules Tx in the present embodiment may include a single transmitting antenna or may include a plurality of transmitting antennas. The receiving radar modules Rx in the present embodiment may include a single receiving antenna or may include a plurality of receiving antennas. In addition, the transmitting radar modules Tx and the receiving radar modules Rx may be arranged (mounted) at arbitrary positions on the plurality of panels 2a and 2b described above.

Although the radar device 2 operates to transmit a radio wave from the transmitting radar modules Tx (transmitting antenna) to the inspection subject P and receive a reflected wave from the inspection subject P by the receiving radar modules Rx (receiving antenna) as described above, in the following description, a combination of the transmitting radar modules Tx and the receiving radar modules Rx operating in this manner is referred to as a transmitting/receiving radar module.

Note that, although a combination of the transmitting radar modules Tx including a single or a plurality of transmitting antennas and the receiving radar modules Rx including a single or a plurality of receiving antennas will be described as a transmitting/receiving radar module in the present embodiment, the transmitting/receiving radar module may include, for example, a single or a plurality of transmitting/receiving antennas configured to transmit a radio wave to the inspection subject P and receive a reflected wave from the inspection subject P. For example, the transmitting/receiving radar module may include a single or a plurality of transmitting antennas and a single or a plurality of receiving antennas.

FIG. 2 is a diagram illustrating an example of a system configuration of the security inspection system 1 according to the present embodiment. As illustrated in FIG. 2, the security inspection system 1 includes the radar device 2, an optical sensor device 3, and an inspection device 4.

The radar device 2 includes the plurality of panels 2a and 2b in which the plurality of transmitting radar modules Tx and the plurality of receiving radar modules Rx are arranged as illustrated in FIG. 1. The radar device 2 operates the transmitting/receiving radar module (any combination of the transmitting radar modules Tx and the receiving radar modules Rx) described above so that a reflected wave of the radio wave transmitted from the transmitting radar modules Tx from the inspection subject P is received by some or all of the receiving radar modules Rx in the plurality of panels 2a and 2b. The radar device 2 outputs radar data based on the reflected wave from the inspection subject P received by the receiving radar modules Rx to the inspection device 4. The receiving radar modules Rx that receive the reflected wave are provided in the panel (2a or 2b) on the same side as the transmitting radar modules Tx that have transmitted a radio wave and/or the panel (2a or 2b) on the side opposite thereto among the plurality of panels 2a and 2b arranged to sandwich the space in which the inspection subject P moves. To enable synchronized and linked measurement between the transmitting/receiving radar modules, a master (not illustrated) that supplies a clock, a reference signal, or a trigger to the transmitting/receiving radar module is provided.

The optical sensor device 3 is arranged, for example, near the radar device 2, and includes an optical sensor configured to image (capture) the inspection subject P passing through the space between the plurality of panels 2a and 2b. The optical sensors may be provided at two locations near the radar device 2. For example, it may be provided on the entrance side (one side of the plurality of panels 2a and 2b arranged side by side) and the exit side (the other side of the plurality of panels 2a and 2b arranged side by side) of the radar device 2 through which the inspection subject P passes. With such an arrangement, the front and back of the inspection subject P passing through the radar device 2 can be imaged. The optical sensor includes, for example, an imaging device such as a camera, and the optical sensor device 3 acquires an image including the inspection subject P (hereinafter, referred to as a camera image) as information of the inspection subject P imaged by the optical sensor (information recognized by the sensor). The optical sensor device 3 outputs the acquired camera image to the inspection device 4. Note that another sensor capable of acquiring the region information may be used instead of the optical sensor device 3 (optical sensor).

The inspection device 4 is an electronic apparatus (information processing device) connected to the radar device 2 and the optical sensor device 3 and perform a security inspection on the inspection subject P. The inspection device 4 performs a security inspection using the radar data output from the radar device 2 in consideration of the region information of a region of the inspection subject P acquired based on the camera image output from the optical sensor device 3.

Note that, although the radar device 2, the optical sensor device 3, and the inspection device 4 are illustrated as separate devices in FIG. 2, in the security inspection system 1, for example, at least two of the radar device 2, the optical sensor device 3, and the inspection device 4 may be integrally configured.

FIG. 3 illustrates an example of a hardware configuration of the inspection device 4. As illustrated in FIG. 3, the inspection device 4 includes a CPU 41, a nonvolatile memory 42, a main memory 43, a communication device 44, and the like.

The CPU 41 is a processor for controlling operations of various components in the inspection device 4. The CPU 41 may be a single processor or may include a plurality of processors. The CPU 41 executes various programs loaded from the nonvolatile memory 42 on the main memory 43. Note that a GPU may be provided in addition to the CPU 41, and the GPU may perform various inspection processes.

The communication device 44 is a device configured to perform wireless or wired communication. Communication between the inspection device 4 and the radar device 2, and the optical sensor device 3 is realized by the communication device 44.

Although only the nonvolatile memory 42 and the main memory 43 are illustrated in FIG. 3, the inspection device 4 may include, for example, other storage devices such as a hard disk drive (HDD) and a solid state drive (SSD). Further, the inspection device 4 may further include an input device (a mouse, a keyboard, or the like) and a display device (a display or the like).

FIG. 4 is a block diagram illustrating an example of a functional configuration of the inspection device 4. As illustrated in FIG. 4, the inspection device 4 includes a region information acquisition module 401, a central processing module 402, a data collection module 403, a radar image generation module 404, an inspection module 405, and an output processing module 406.

Note that, in the present embodiment, some or all of the modules 401 to 406 illustrated in FIG. 4 are realized by causing the CPU 41 (that is, the computer of the inspection device 4) to execute a predetermined program (hereinafter, referred to as a security inspection program), that is, by software. The security inspection program may be stored in a computer-readable storage medium and distributed, or may be downloaded to the inspection device 4 through a network.

Here, although some or all of the modules 401 to 406 have been described as being realized by software, some or all of the modules 401 to 406 may be realized by hardware such as an integrated circuit (IC), or may be realized by a combination of software and hardware.

The region information acquisition module 401 acquires (inputs) the camera image output from the optical sensor device 3 as described above. The region information acquisition module 401 acquires region information regarding the region of the inspection subject P included in the acquired camera image. Note that the region information is acquired based on the skeleton or the like of the inspection subject P ascertained from the camera image.

The central processing module 402 generates first or second instruction information based on the region information acquired by the region information acquisition module 401. That is, the central processing module 402 can generate at least one of the first or second instruction information based on the region information. Note that, although details will be described later, the first instruction information corresponds to operating radar module instruction information (signal) for instructing (the operation of) the transmitting/receiving radar module set based on the region information from (the combination of) the plurality of transmitting radar modules Tx and the plurality of receiving radar modules Rx provided in the radar device 2 (the plurality of panels 2a and 2b). In addition, the second instruction information corresponds to analysis area instruction information (signal) for instructing an area (that is, an area to be analyzed for a security inspection) of the inspection subject P to perform the security inspection set based on the region information. When the first instruction information (operating radar module instruction information) is generated by the central processing module 402, the central processing module 402 outputs the first instruction information to the radar device 2. When the second instruction information (analysis area instruction information) is generated by the central processing module 402, the central processing module 402 outputs the second instruction information to the radar image generation module 404.

Here, in a case where the first instruction information is output from the central processing module 402 as described above, the radar device 2 operates the transmitting/receiving radar module (the combination of the transmitting radar modules Tx and the receiving radar modules Rx) instructed by the first instruction information. As a result, the radar device 2 transmits a radio wave from the transmitting radar modules Tx of the transmitting/receiving radar module instructed by the first instruction information, and receives a reflected wave from the inspection subject P by the receiving radar modules Rx of the transmitting/receiving radar module. The radar device 2 outputs radar data based on the reflected wave from the inspection subject P to the inspection device 4.

The data collection module 403 collects (inputs) the radar data output from the radar device 2. In other words, when the first instruction information is generated by the central processing module 402, the data collection module 403 collects the radar data based on the reflected wave received by the transmitting/receiving radar module through the operation of the transmitting/receiving radar module (a part of the plurality of transmitting radar modules Tx and the plurality of receiving radar modules Rx) set based on the first instruction information (region information).

The radar image generation module 404 generates a radar image including the inspection subject P based on the radar data collected by the data collection module 403. Note that, when the second instruction information is generated by the central processing module 402, the radar image generation module 404 generates a radar image corresponding to an area in the inspection subject P (for example, an area including some region of the inspection subject P) set based on the second instruction information (region information). In other words, the radar image generation module 404 generates a radar image for performing the security inspection on a part of the radar data collected by the data collection module 403 (radar data corresponding to a part of the inspection subject P set based on the second instruction information).

The inspection module 405 performs a security inspection based on the radar image generated by the radar image generation module 404 (that is, for the area in the inspection subject P set based on the second instruction information).

The output processing module 406 executes processing of outputting the result of the security inspection by the inspection module 405.

Note that, although the inspection device 4 has been described as including the modules 401 to 406, some of the modules 401 to 406 may be arranged on the radar device 2 or the optical sensor device 3 side.

An example of a processing procedure of the security inspection system 1 when a security inspection is performed on an inspection subject P will be described below with reference to the sequence chart of FIG. 5.

First, for example, as described above, the inspection subject P moving in the facility where the radar device 2 is installed is guided to pass through the space between the plurality of panels 2a and 2b included in the radar device 2. In this case, the optical sensor (for example, a camera) included in the optical sensor device 3 is arranged at a position where the optical sensor can image (capture) the inspection subject P passing through the space between the plurality of panels 2a and 2b, and images the inspection subject P (step S1).

When the processing of step S1 is executed, the optical sensor device 3 acquires a camera image including the inspection subject P imaged by the optical sensor, and outputs the camera image to the inspection device 4 (step S2).

The region information acquisition module 401 included in the inspection device 4 acquires the camera image output in step S2. The region information acquisition module 401 acquires skeleton information regarding the skeleton of the inspection subject P included in the acquired camera image based on the camera image. The region information acquisition module 401 acquires the region information regarding the region of the inspection subject P based on the camera image and the skeleton information (step S3).

Here, an overview of the processing in step S3 will be described with reference to FIG. 6. First, the region information acquisition module 401 extracts the inspection subject P included in the camera image 100 by analyzing the camera image 100, and acquires the skeleton information 101 indicating the skeleton formed of regions of the inspection subject P. Note that, in the example illustrated in FIG. 6, the skeleton represented by the skeleton information 101 includes, for example, a plurality of regions such as the head, shoulders, arms (elbows), hands, abdomen (waist), knees, and feet.

Next, the region information acquisition module 401 specifies the position of each region constituting the skeleton represented by the acquired skeleton information on the camera image 100, and acquires the region information including the camera coordinate value indicating the specified position of the regions. That is, the region information acquisition module 401 acquires, for each inspection subject P, information for specifying at least one of regions such as the head, shoulders, arms (elbows), hands, abdomen (waist), knees, and feet and position information corresponding thereto. The position information may be information indicating the center position of the region or information indicating the range of the region. Note that the camera coordinate value included in the region information includes an x coordinate value (x') and a y coordinate value (y') defined in the camera image 100. That is, the region information in the present embodiment can be said to correspond to, for example, region coordinate information representing each region of the inspection subject P with the camera coordinate value (x', y').

FIG. 7 illustrates an example of a data structure of the region information acquired in step S3. As illustrated in FIG. 7, the region information includes a camera coordinate value (an x coordinate value and a y coordinate value) of the region in association with (the region name of) the region constituting the skeleton represented by the skeleton information.

Although the region information illustrated in FIG. 7 indicates that the x coordinate value of a region A of the inspection subject P is "$x_a$'" and the y coordinate value is "$y_a$'" (that is, the camera coordinate value of the region A is ($x_a$', $y_a$')), the region information includes camera coordinate values of all regions of the inspection subject P (all regions constituting the skeleton represented by the skeleton information).

Returning to FIG. 5 again, the central processing module 402 performs a region coordinate conversion based on the camera image and the region information acquired in step S3 (step S4).

Here, an overview of the region coordinate conversion performed in step S4 will be described with reference to FIG. 8.

First, the region information acquired in step S3 described above includes a camera coordinate value (that is, the x coordinate value and the y coordinate value defined in the camera image), but the camera coordinate value is converted into a global coordinate value in the region coordinate conversion. Note that, the global coordinate value is a coordinate value (three-dimensional space coordinates) representing a position of (each region of) the inspection subject P in the real space where the inspection subject P exists, and includes an x coordinate value, a y coordinate value, and a z coordinate value defined in the real space.

In this case, for example, the position of the inspection subject in the real space (that is, the global coordinate value) corresponding to a reference point included in the camera image is held in advance in the central processing module 402, and in step S4, the camera coordinate value (x', y') of each region of the inspection subject P included in the region information described above is converted into global coordinate value (x, y, z) based on the correspondence relationship between the camera coordinate value representing the position of the reference point in the camera image and the global coordinate value representing the position of the reference point in the real space.

FIG. 8 illustrates an example in which, for example, global coordinate values (0, 0, 0) representing the position of the reference point in a case where an end of the panels included in the radar device 2 included in the camera image is set as a reference point (origin) are held in advance, and the camera coordinate value ($x_a$', $y_a$') of the region A of the inspection subject P are converted into global coordinate value ($x_a$, $y_a$, $z_a$) based on the correspondence relationship between the camera coordinate value and the global coordinate value of the reference point. Here, although the region coordinate conversion performed on the camera coordinate value of the region A of the inspection subject P has been described, the region coordinate conversion is similarly performed on camera coordinate value of other regions.

Note that, although the camera coordinate value of each region of the inspection subject P included in the region information is converted into the global coordinate value in step S4, for example, a process of acquiring (compensating for) a global coordinate value representing the position of a new region (a region other than the region constituting the skeleton represented by the skeleton information described above) of the inspection subject P using the global coordinate value converted from the camera coordinate value may be further executed.

Returning to FIG. 5 again, the central processing module 402 generates the first and second instruction information based on the region information (that is, the region information including the global coordinate value representing the position of each region of the inspection subject P) after the region coordinate conversion is performed in step S4 (step S5).

Hereinafter, the processing of step S5 will be specifically described. In the present embodiment, the central processing module 402 holds prior information in advance, and in step S5, the first and second instruction information are generated using the prior information. Note that the prior information includes index information and analyzable area information.

Here, FIG. 9 illustrates an overview of index information included in the prior information. As illustrated in FIG. 9, the index information corresponds to an identifier allocated to each of combinations of the transmitting radar modules Tx and the receiving radar modules Rx (that is, the transmitting/receiving radar module).

In the example illustrated in FIG. 9, for example, index information "#1" is allocated to a combination of a transmitting radar module Tx1 and a receiving radar module Rx1. In addition, for example, index information "#2" is allocated to a combination of a transmitting radar module Tx2 and a receiving radar module Rx2. In addition, for example, index information "#n" is allocated to a combination of a transmitting radar module Txn and a receiving radar module Rxn (n is an integer equal to or greater than 3). In addition, for example, index information "#N" is allocated to a combination of a transmitting radar module TxN and a receiving radar module RxN (N is an integer equal to or greater than n+1).

Note that, although only the index information "#1", "#2", . . . , "#n", . . . , and "#N" is illustrated in FIG. 9 for convenience of description, it is assumed in the present embodiment that, in a case where at least one of the transmitting radar module Tx and the receiving radar module Rx is different, different index information is allocated (that is, index information is allocated to all combinations of the transmitting radar modules Tx and the receiving radar modules Rx).

Here, FIG. 10 illustrates an overview of analyzable area information included in the prior information. In the present embodiment, the analyzable area information includes an analyzable area corresponding to a space (that is, an area that can be analyzed by transmission of radio waves and reception of reflected waves by the transmitting/receiving radar module) in which the security inspection can be performed by operating a combination of the transmitting radar module Tx and the receiving radar module Rx (that is, the transmitting/receiving radar module) to which the index information is allocated in association with the index information.

Here, as illustrated in FIG. 10, the analyzable area included in the analyzable area information is defined by a range of the global coordinate value (a x coordinate value, a y coordinate value, and a z coordinate value).

Specifically, in the example illustrated in FIG. 10, for example, the x coordinate value of the space (That is, the analyzable area corresponding to the index information "#1") $\Omega_1$ in which the security inspection can be performed by operating the transmitting/receiving radar module (the combination of the transmitting radar module Tx1 and the receiving radar module Rx1) to which the index information "#1" is allocated is in a range of $x\_1_{ini}$ or more and $x\_1_{end}$ or less. In addition, the y coordinate value of the analyzable area $\Omega_1$ corresponding to the index information "#1" is in a range of $y\_1_{ini}$ or more and $y\_1_{end}$ or less. The z coordinate value of the analyzable area 21 corresponding to the index information "#1" is in a range of $z\_1_{ini}$ or more and $z\_1_{end}$ or less.

Here, although only the analyzable area $\Omega_1$ corresponding to the index information "#1" has been described, the same applies to the analyzable area (for example, an analyzable area $\Omega_2$ or the like corresponding to the index information "#2") corresponding to other index information.

Here, although the first and second instruction information are generated by using the above-described prior information in step S5 as described above, a process of generating the first instruction information (hereinafter referred to as a first instruction information generation process) and a process of generating the second instruction information (hereinafter referred to as a second instruction information generation process) will be described below.

First, a first instruction information generation process will be described. In the first instruction information generation process, the transmitting/receiving radar module (the combination of the transmitting radar module Tx and the receiving radar module Rx) to be operated for the security inspection is set based on the region information (the global coordinate value of each region of the inspection subject P) and the prior information (index information and analyzable area information).

Specifically, for example, the central processing module 402 specifies index information corresponding to the analyzable area (appropriate area close to the target region) including global coordinate values (three-dimensional space coordinates) of a previously designated region (hereinafter, referred to as an inspection target region) among regions of the inspection subject P, and sets the specified index information (allocated to the transmitting/receiving radar module). In other words, in the first instruction information generation process, a transmitting/receiving radar module capable of transmitting a radio wave to an area including (the position in the real space for) the inspection target region and receiving a reflected wave from the area is set (that is, the first instruction information for designating an antenna that transmits the radio wave corresponding to the inspection target region and an antenna that receives the reflected wave from the inspection target region is generated).

Note that, in the security inspection as to whether the inspection subject P is carrying a hazard, the inspection is performed for each region (for example, the abdomen, arms, and the like). Note that the number of regions to be inspected may be one or more.

FIG. 11 is a diagram for describing an overview of the first instruction information generation process. In FIG. 11, it is assumed that regions A to D are inspected.

FIG. 11 illustrates that, when the region A whose global coordinate value is $(x_a, y_a, z_a)$ is set as an inspection target region, an appropriate area close to the region A (an analyzable area including the global coordinate value of the region A) is an analyzable area $\Omega_A$, and thus the first instruction information in which the index information "#A" corresponding to the analyzable area $\Omega_A$ is set is generated.

Note that, although detailed description is omitted, the first instruction information in which the index information "#B" is set is generated when the region B is set as the inspection target region, the first instruction information in which the index information "#C" is set is generated when the region C is set as the inspection target region, and the first instruction information in which the index information "#D" is set is generated when the region D is set as the inspection target region.

Next, a second instruction information generation process will be described. In the second instruction information generation process, an analysis area is set based on the region information (the global coordinate value of each region of the inspection subject P), the prior information (the index information and the analyzable area information), and the first instruction information (in which the index information is).

Specifically, the central processing module 402 sets, as the analysis area, an area (that is, a partial area of the analyzable area) including the global coordinate value of the inspection target region included in the region information in the analyzable area corresponding to the index information set in the first instruction information.

FIG. 12 is a diagram for describing an overview of the second instruction information generation process. In the example illustrated in FIG. 12, for example, an area 200 of a predetermined range centered on the global coordinate value (region's spatial coordinate position) of the inspection target region is set as an analysis area (that is, the analysis area is set based on the region's space coordinate information). In other words, in the second instruction information generation process, the second instruction information designating an area including the inspection target region as an area where the security inspection is performed is generated.

Note that the magnitude (size) and resolution of the analysis area set in the second instruction information generation process may be arbitrarily set. Specifically, the analysis area is set in consideration of the inspection target region (a region for detecting whether the inspection subject P is carrying a hazard), the viewing angle and resolution of the radar device 2, the magnitude of the hazard, and the like.

In addition, although the second instruction information setting process is executed, for example, every time the security inspection is performed (that is, for each inspection subject P), in order to reduce the processing amount of the second instruction information setting process, a process of selecting an optimal analysis area (that is, an analysis area to be set) from a plurality of predetermined analysis areas based on, for example, the global coordinate value of the inspection target region may be executed.

Furthermore, the analysis area set in the second instruction information setting process is defined by a range of global coordinate value (a x coordinate value, a y coordinate value, and a z coordinate value), similarly to the analyzable area described above.

Returning to FIG. 5 again, the central processing module 402 outputs the first instruction information generated in step S5 to the radar device 2 (step S6). Note that, in the first instruction information, the index information allocated to the transmitting/receiving radar module is set, and the process of step S6 is executed to instruct the radar device 2 to operate the transmitting/receiving radar module.

The radar device 2 executes a radar sensing process in accordance with the first instruction information output from the central processing module 402 (the inspection device 4) in step S6.

Specifically, the radar device 2 operates the transmitting/receiving radar module to which the index information set in the first instruction information is allocated (step S7).

When the process of step S7 is executed, a radio wave is transmitted from the transmitting radar module Tx of the operating transmitting/receiving radar module to the inspection subject P, and a reflected wave from the inspection subject P is received by the receiving radar module Rx of the transmitting/receiving radar module. Thereby, the radar device 2 acquires radar data based on the reflected wave from the inspection subject P (step S8).

Here, FIG. 13 illustrates an overview of a radar sensing process by the radar device 2. In FIG. 13, a case where the first instruction information in which the index information "A", "B", "#C", and "#D" is set as illustrated in FIG. 11 is output from the inspection device 4 to the radar device 2 is assumed.

In this case, as illustrated in FIG. 13, the transmitting/receiving radar modules to which the index information "A", "B", "C", and "#D" are respectively allocated are sequentially operated to execute the radar sensing process. According to this, radar data A is acquired according to the operation of the transmitting/receiving radar module to which the index information "#A" is allocated, radar data B is acquired according to the operation of the transmitting/receiving radar module to which the index information "#B" is allocated, radar data C is acquired according to the operation of the transmitting/receiving radar module to which the index information "#C" is allocated, and radar data D is acquired according to the operation of the transmitting/receiving radar module to which the index information "#D" is allocated.

Returning to FIG. 5 again, the radar data acquired in step S8 is output from the radar device 2 to the inspection device 4 (step S9).

Next, the data collection module 403 included in the inspection device 4 collects the radar data output from the radar device 2 in step S9 (step S10).

Here, the second instruction information generated in step S5 described above is output from the central processing module 402 to the radar image generation module 404. Note that, as an analysis area is set in the second instruction information and the second instruction information is output to the radar image generation module 404, the radar image generation module 404 is instructed to generate a radar image corresponding to the analysis area (that is, to perform a security inspection on the analysis area).

Based on the second instruction information output from the central processing module 402 and the radar data collected in step S10, the radar image generation module 404 generates a radar image including the inspection subject P (a radar image corresponding to a part of the inspection subject P) (step S11). Note that, in step S11, a radar image of the analysis area (the area including the inspection target region of the inspection subject P) set at least in the second instruction information is generated. In other words, in step S11, a radar image is generated using a part of the radar data collected in step S10 (radar data necessary for imaging the analysis area).

FIG. 14 conceptually illustrates the radar image (captured image) generated in step S11. Here, it is assumed that the radar data A to D have been collected according to the operation of the transmitting/receiving radar modules to which each piece of the index information "#A", "B", "#C", and "#D" is allocated as described above with reference to FIG. 13.

In this case, the radar image generation module 404 generates the radar image A corresponding to the analysis area including the region A based on (a part of) the radar data A, generates the radar image B corresponding to the analysis area including the region B based on (a part of) the radar data B, generates the radar image C corresponding to the analysis area including the region C based on (a part of) the radar data C, and generates the radar image D corresponding to the analysis area including the region D based on (a part of) the radar data D.

Note that, although the same radar images A to D are illustrated for convenience since FIG. 14 is a diagram for conceptually describing the radar images, the radar images A to D are different images depending on whether a hazard is being carried in the corresponding regions A to D (that is, the analysis areas) or specific regions A to D, and the like.

Returning to FIG. 5 again, the radar images generated in step S11 are output from the radar image generation module 404 to the inspection module 405 together with (the region name of) the inspection target region for which the analysis area is set in the index information set in the first instruction information and the second instruction information.

The inspection module 405 acquires the radar image, the index information, and the inspection target region output from the radar image generation module 404, and performs the security inspection on the inspection subject P (step S12).

Hereinafter, the process of step S12 will be specifically described. In the present embodiment, the inspection module 405 holds, for example, a statistical model prepared in advance, and acquires the result of the security inspection from the statistical model and the radar images output from the radar image generation module 404. This statistical model is constructed (generated) to receive input of the radar images and output (estimate) whether a hazard exists (that is, the inspection subject P is carrying a hazard in a region included in the analysis area) in the analysis area corresponding to the radar image as a result of the security inspection on the inspection subject P, for example.

According to this configuration, the inspection module 405 can acquire the result of the security inspection output from the statistical model by inputting the radar images generated in step S10 to the statistical model held by the inspection module 405.

Note that the statistical model is generated based on a technique such as artificial intelligence (AI), machine learning, or deep learning. Specifically, the statistical model may be generated by applying various machine learning algorithms, for example, a neural network or a random forest. In other words, it can be said that the process of step S12 (that is, the security inspection) described above is realized by, for example, a process of recognizing a radar image by AI.

Here, the statistical model may be prepared for each inspection target region, for example. In this case, by inputting the radar images generated in step S11 to the statistical model prepared for the inspection target region acquired by the inspection module 405, it is possible to acquire a highly accurate result of the security inspection in consideration of the inspection target region subject to the security inspection.

Further, the statistical model may be prepared for each piece of index information (that is, a combination of the transmitting radar module Tx and the receiving radar module Rx). In this case, by inputting the radar images generated in step S11 to the statistical model prepared for the index information (that is, the transmitting/receiving radar modules operated in the radar device 2) acquired by the inspection module 405, it is possible to acquire the result of the security inspection with high accuracy in consideration of the transmitting/receiving radar modules operated for the security inspection (or the position where the transmitting/receiving radar modules are disposed).

Note that the statistical model may be prepared for each combination of the inspection target region and the index information described above.

In addition, the statistical model may be constructed to output the result of the security inspection by inputting, for example, the inspection target region together with the radar images. In addition, the statistical model may be constructed to output the result of the security inspection by receiving an input of the index information together with the radar images. Further, the statistical model may be constructed to output the result of the security inspection by receiving an input of the inspection target region and the index information together with the radar images.

When the process of step S12 is executed, the output processing module 406 outputs the result of the security inspection performed in step S12 (step S13).

Here, the output processing module 406 includes, for example, a display processing module or an alarm processing module. The display processing module displays the result of the security inspection described above on, for example, a display device included in the inspection device 4 (that is, whether the inspection subject P is carrying a hazard is displayed). In this case, the display processing module may superimpose and display text, a mark, or the like indicating that the inspection subject P is carrying a hazard on the camera image as a result of the security inspection, for example. Furthermore, although the result of the security inspection is acquired by inputting the radar images to the statistical model as described above, the display processing module may display that the hazard is being carried in the inspection target region on the camera image (that is, the inspection target region is highlighted on the camera image to be displayed). In other words, the display processing module may display the level of hazard for each region of the inspection subject P.

On the other hand, for example, when the result of the security inspection indicating that the inspection subject P is carrying a hazard is acquired, the alarm processing module issues an alarm indicating that the inspection subject P is carrying a hazard to the inspection subject P. Note that "issuing an alarm" includes, for example, outputting an alarm sound or turning on a lamp in the radar device 2. Here, although it has been described that the alarm is issued to the inspection subject P, in order to avoid a situation where the inspection subject P conceals the hazard, the alarm may be issued to an administrator or the like of the security inspection system 1 (the inspection device 4).

Note that, although it has been described that the processes of steps S1 to S13 are sequentially executed in FIG. 5 as described above, the order of the processes may be switched. Specifically, although it has been described that the first and second instruction information are generated (that is, the first and second instruction information generation processes are executed) in step S5 in FIG. 5, the processes of steps S6 to S10 (that is, the radar sensing process of the radar device 2) may be executed while the first instruction information generation process and the second instruction information generation process are executed. In other words, the security inspection system 1 according to the present embodiment may operate such that the process of the radar device 2 interrupts the process (operation) of the central processing module 402.

Further, although it has been described that the first and second instruction information are generated in FIG. 5, at least one of the first and second instruction information may be generated in the present embodiment.

In the present embodiment as described above, the region information regarding the region of the inspection subject P is acquired based on the image captured by the optical sensor (information recognized by the sensor), and the first or second instruction information is generated based on the acquired region information. When the first instruction information is generated, radar data based on the reflected wave received by the transmitting/receiving radar modules (that is, some of the plurality of antennas included in the radar device 2) set based on the region information is collected. In addition, when the second instruction information is generated, a security inspection is performed on the region including some region (inspection target region) of the inspection subject P set based on the region information.

In the present embodiment, by generating the first or second instruction information based on the region information as described above, the security inspection can be efficiently performed (that is, efficient security inspection is realized).

Note that, in the present embodiment, for example, skeleton information representing the skeleton of the inspection subject P can be acquired based on a captured image, and region information including the position of the region of the inspection subject P on the image can be acquired based on the acquired skeleton information. In this case, the position of the inspection subject P on the image included in the region information is represented by a camera coordinate value (first coordinate value) defined in the image. In this case, the central processing module 402 converts the camera coordinate value representing the position of the region of the inspection subject P on the image into a global coordinate value (second coordinate value) representing the position of the region of the inspection subject P in the real space, and generates the first and second instruction information on the basis of the global coordinate value.

Specifically, when generating the first instruction information, the central processing module 402 sets a transmitting/receiving radar module that transmits a radio wave to an area including a position in the real space where the inspection target region represented by the global coordinate value exists and receives a reflected wave from the area.

On the other hand, when generating the second instruction information, the central processing module 402 sets an area including the position in the real space where the inspection target region represented by the global coordinate value exists as an area for which a security inspection is to be performed (that is, an analysis area).

Here, an overview of an efficient security inspection implemented in the above-described configuration will be described with reference to FIG. 15.

First, since the transmitting/receiving radar modules (operating radar modules) to be operated based on the first instruction information is instructed to the radar device 2 in the present embodiment, it is unnecessary to operate all the transmitting radar modules Tx and the receiving radar modules Rx included in the radar device 2. According to such a configuration, in the sensing phase, the time required for the radar sensing process by the radar device 2 can be shortened, and the amount of radar data (that is, the amount of radar data used for generating radar images) collected by executing the radar sensing process can be reduced, and thus efficient security inspections can be realized.

In addition, since the analysis area (that is, the area including some region of the inspection subject P in the analyzable area corresponding to the index information allocated to the operating transmitting/receiving radar modules) is instructed to the radar image generation module 404 based on the second instruction information described above in the present embodiment, it is unnecessary to generate a radar image including the entire analyzable area. According to such a configuration, since the generation time of the radar images can be shortened in the phase of radar image generation, efficient security inspections can be realized.

Furthermore, in the present embodiment, a radar image including the inspection subject P is generated based on the collected radar data, and the generated radar image is input to the statistical model (AI) prepared in advance to acquire the result of the security inspection with respect to the inspection subject P output from the statistical model (that is, the security inspection is performed by using the statistical model). Note that, in the present embodiment, for example, radar images of each inspection target region of the inspection subject P are input to the statistical model, and thus the result of the security inspection considering the inspection target region is output from the statistical model as illustrated in FIG. 16. According to such a configuration, the result of the security inspection can be prevented from changing due to body shapes and postures (individual differences such as height difference, body type, way of walking, etc.) of the inspection subject P (that is, dependence on body shape and posture) in the phase of the security inspection, and thus, the accuracy of the security inspection can be improved.

That is, in the present embodiment, it is possible to realize the efficient and effective security inspection system 1 (body inspection for the inspection subject P) with the trinity of "sensing", "radar image generation", and "security inspection (for example, recognition of whether the inspection subject P is carrying a hazard)" by using the region information regarding the region of the inspection subject P.

Note that the security inspection in the present embodiment is performed by using a statistical model among a plurality of statistical models prepared in advance, which corresponds to at least one of the inspection target region and the index information allocated to the operating transmitting/receiving radar modules. With such a configuration, security inspections can be performed in consideration of the inspection target region or the operating transmitting/receiving radar modules in the present embodiment, and thus, a highly accurate result of the security inspection can be acquired.

In addition, the security inspection may be performed by using a statistical model to which at least one of the inspection target region and the index information described above is input together with radar images. Such a configuration can also make it possible to acquire a highly accurate result of the security inspection.

Furthermore, although the result of the security inspection described above is output by the output processing module 406 in the present embodiment, the output processing module 406 includes, for example, the display processing module or the alarm processing module. When the result of the security inspection including the fact that the inspection subject P is carrying a hazard is acquired, the display processing module displays text, a mark, or the like indicating that the inspection subject P is carrying a hazard. On the other hand, the alarm processing module issues an alarm when the result of the security inspection including the fact that the inspection subject P is carrying hazard is acquired. Such a configuration can also make it possible to easily ascertain the result of the security inspection.

Note that, although it has been described that the radar data based on the reflected wave received by the transmitting/receiving radar modules (especially, the receiving radar module Rx therein) is collected according to operations of the transmitting/receiving radar modules set in the first instruction information in the present embodiment, the data collection module 403 may be configured to collect radar data based on the reflected wave received by all of the transmitting/receiving radar modules (especially, the receiving radar module Rx therein) according to operations of all of the transmitting/receiving radar modules, for example, and extract radar data based on the reflected wave received by the transmitting/receiving radar module sets in the first instruction information from the collected radar data. In such a configuration, the time required for the radar sensing process in the radar device 2 described above cannot be shortened, but the amount of radar data used to generate radar images can be reduced.

Furthermore, although it has been described that the optical sensor included in the optical sensor device 3 is a camera (imaging device) in the present embodiment, the optical sensor may be, for example, a Light Detection and Ranging (LiDAR) sensor that measures a distance to the inspection subject P by emitting light. In such a configuration, an image (a distance image) generated based on the distance measured by the LiDAR sensor is output from the optical sensor device 3 as imaging information, and the region information may be acquired based on the distance image. Note that, although it has been described here that the optical sensor is a LiDAR sensor, the optical sensor may be configured to capture an image from which region information can be acquired.

Furthermore, although it has been described that a security inspection is mainly performed on an inspection subject in the present embodiment, the present embodiment can be applied, for example, to a case where a security inspection is performed on an object passing through the radar device 2 (a plurality of panels) while hiding a hazard.

Meanwhile, although the configuration in which the security inspection is performed by using the statistical model has been described in the present embodiment, the security inspection system 1 according to the present embodiment may have a function of learning the statistical model to generate the statistical model (hereinafter, referred to as a learning function).

A security inspection system with the learning function will be described as a modification of the present embodiment. Note that, since the security inspection system according to the modification of the present embodiment has a configuration similar to that in FIG. 2, it will be described with reference to FIG. 2.

FIG. 17 is a block diagram illustrating an example of a functional configuration of an inspection device 4 according to a modification of the present embodiment. In FIG. 17, the same parts as those in FIG. 4 are denoted by the same reference numerals, and the detailed description thereof is omitted. Here, parts different from those in FIG. 4 will be described.

As illustrated in FIG. 17, the inspection device 4 includes a labeling module 407 and a learning processing module 408 as functional modules for realizing the above-described learning function. Note that, in the modification of the present embodiment, a part or all of the labeling module 407 and the learning processing module 408 illustrated in FIG. 17 may be realized by software, may be realized by hardware, or may be realized by a combination of software and hardware.

The labeling module 407 puts a label on a radar image generated by a radar image generation module 404.

The learning processing module 408 executes a processing of causing a statistical model to learn the radar image labeled by the labeling module 407 (learning process).

Next, an example of a processing procedure of the security inspection system 1 when the statistical model performs learning according to the modification of the present embodiment will be described with reference to the sequence chart of FIG. 18.

Note that, although FIG. 18 illustrates a processing procedure of the security inspection system 1 at the time of learning, whereas FIG. 5 illustrates a processing procedure of the security inspection system 1 at the time of operation (that is, when the security inspection is performed), the process is similarly executed in the procedures of learning and operation until a radar image is generated.

In this case, processes of steps S21 to S31 corresponding to the processes of steps S1 to S11 illustrated in FIG. 5 are executed. Note that, since the processes of steps S21 to S31 are for the statistical model to perform learning, the processes are executed when an inspection subject P who has been determined as of whether he or she is carrying a hazard (that is, an inspection subject P whose security inspection result is known) is available.

Next, the labeling module 407 executes a process (labeling process) of giving a label to the radar images generated in step S31 (step S32).

Hereinafter, the process of step S32 will be described in detail. First, it is assumed to generate the statistical model constructed to output the result of the security inspection by receiving an input of the inspection target region together with the radar images as described above. In this case, the label put on the radar images in step S32 described above includes the inspection target region (that is, the inspection target region is added to the radar images as a label). FIG. 19 conceptually illustrates radar images with inspection target regions added thereto as labels (that is, learning data labeled with the inspection target regions).

On the other hand, for example, it is assumed that a statistical model constructed to output the result of the security inspection is generated by receiving an input of the inspection target regions and index information allocated to the transmitting/receiving radar modules operating in the radar device 2 together with the radar images. In this case, the labels put in step S32 described above include a combination of the inspection target region and the index information (that is, the inspection target region and the index information are added to the radar images as a label). FIG. 20 conceptually illustrates radar images to which inspection target regions and index information are added as a label (that is, learning data labeled with the inspection target regions and the index information).

Note that, it is assumed that, for example, when a statistical model constructed to output the result of a security inspection by receiving an input of the index information allocated to the transmitting/receiving radar modules operating in the radar device 2 together with the radar images is generated, the labels put in step S32 include the index information (that is, index information is added to the radar images as a label).

Returning to FIG. 18 again, the learning processing module 408 executes learning processing (for example, learning by AI) by using the radar image (hereinafter, referred to as a labeled radar image) to which the label is added in step S33 (step S33).

Specifically, the learning process in step S33 includes, for example, processes of acquiring the result of the security inspection output from the statistical model prepared in advance (statistical model before the learning processing is executed) by inputting labeled radar images to the statistical model, and feeding back an error between the result of the security inspection and whether the inspection subject P is carrying a hazard determined in advance as described above (that is, a known result of the security inspection) to the statistical model (that is, a parameter such as a weighting factor of the statistical model is updated to reduce the error).

Note that the process illustrated in FIG. 18 is preferably repeatedly executed with various available inspection subjects P, for example. In addition, although the statistical model that has learned the labeled radar images (learning data) is generated by executing the process illustrated in FIG. 18, the statistical model is used for security inspections performed by the inspection module 405 described above, and thus is assumed to be held inside the inspection module 405, for example.

As described above, in the modification of the present embodiment, the inspection target regions are added to the radar images as labels, and the statistical model performs learning using the radar image to which labels (inspection target regions) are added, and thereby the statistical model (that is, the statistical model capable of estimating a highly accurate result of a security inspection) for performing the security inspection in consideration of the regions of the inspection subject P can be obtained.

In addition, in the case of the configuration in which the first instruction information is generated, the labels put on the radar images described above may include index information allocated to the transmitting/receiving radar modules (transmitting/receiving radar modules operating in the radar device 2) set in the first instruction information. According to such a configuration, it is possible to obtain the statistical model for performing the security inspections in consideration of the operating transmitting/receiving radar modules (the positions thereof).

Although the inspection device 4 included in the security inspection system 1 has been described as having both the function of performing security inspections (hereinafter, referred to as a security inspection function) and the learning function in the modification of the present embodiment, the security inspection system 1 may include a learning device including the modules 401 to 404, 407, and 408 illustrated in FIG. 17 separately from the inspection device 4 having the configuration illustrated in FIG. 4, for example. That is, the security inspection system 1 according to the modification of the present embodiment may have a configuration in which the security inspection function (or a functional module for realizing the security inspection function) and the learning function (or a functional module for realizing the learning function) are arranged in separate devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiments, the following supplementary notes are further disclosed.

(1)

A security inspection system including a plurality of antennas for transmitting a radio wave to a target and receiving a reflected wave from the target, and a processor configured to collect received data based on the reflected wave and perform a security inspection on the target based on the received data, wherein
  the processor is configured to:
    acquire region information regarding a region of the target based on information recognized by a sensor that acquires information of the target;
    generate first or second instruction information based on the acquired region information;
    collect received data based on a reflected wave received by a part of the antennas set based on the first instruction information when the first instruction information is generated; and
    perform a security inspection on a part of the received data set based on the second instruction information when the second instruction information is generated.

(2)

The security inspection system according to (1), wherein the processor is configured to:
  generate an image including the target based on the received data; and
  acquire a result of the security inspection from a statistical model prepared in advance corresponding to a region and the generated image.

(3)

The security inspection system according to (1) or (2), wherein the processor is configured to generate an image corresponding to a part of the target when the second instruction information is generated.

(4)

The security inspection system according to (2), wherein the processor is configured to use a statistical model among a plurality of statistical models prepared in advance corresponding to at least one of a region of the target and index information allocated to some of the antennas.

(5)

The security inspection system according to (2), wherein the processor is configured to use a statistical model to which at least one of a region of the target and index information allocated to some of the antennas is input together with the generated image.

(6)

The security inspection system according to any one of (1) to (5), wherein the sensor is a sensor that captures an image of the target, and the processor is configured to acquire skeleton information indicating a skeleton of the target based on the captured image, and acquire region information including a position of the region of the target on the image based on the acquired skeleton information.

(7)

The security inspection system according to (6), wherein the position of the region of the target on the image included in the region information is represented by a first coordinate value defined in the image.

(8)

The security inspection system according to (7), wherein the processor is configured to convert the first coordinate value representing the position of the region of the target on the image into a second coordinate value representing a position of the region of the target in a real space, and generates the first instruction information or the second instruction information based on the second coordinate value.

(9)

The security inspection system according to any one of (1) to (8), wherein the processor is configured to generate the first instruction information that designates an antenna that transmits a radio wave corresponding to the region of the target and an antenna that receives a reflected wave from the region.

(10)

The security inspection system according to any one of (1) to (9), wherein the processor is configured to generate the second instruction information designating an area including the region of the target as an area for which the security inspection is performed.

(11)

The security inspection system according to any one of (2), (4), and (5), wherein
  the processor is configured to output a result of the security inspection.

(12)

The security inspection system according to (11), wherein
  the processor is configured to display a result of the security inspection or issue an alarm based on the result of the security inspection.

(13)

The security inspection system according to (12), wherein
  the result of the security inspection includes whether the target is carrying a predetermined object, the processor is configured to display text or a mark indicating that the target is carrying the predetermined object when a result of the security inspection indicating that the target is carrying the predetermined object is acquired, or issue an alarm when a result of the security inspection indicating that the target is carrying a predetermined object is acquired.

(14)

The security inspection system according to any one of (2), (4), (5), and (11) to (13), wherein the processor is configured to:

put a region of the target on the generated image as a label; and cause the statistical model to learn using the image on which the label is put.

(15)

The security inspection system according to (14), wherein the label put on the image includes index information allocated to some of the antennas set based on the region information.

What is claimed is:

1. A security inspection system comprising:

a plurality of antennas configured to transmit a radio wave to a target and receive a reflected wave from the target, and a hardware processor configured to collect received data based on the reflected wave and perform a security inspection on the target based on the received data, wherein:

the hardware processor is configured to:

acquire, from a sensor, region information regarding a region of the target;

generate at least one of first instruction information and second instruction information, based on the acquired region information;

collect received data based on a reflected wave;

generate a first image including the target based on the received data; and perform a security inspection based on a statistical model and the first image, the sensor is a sensor that captures an image of the target, the region information is based on skeleton information and includes a position of the region of the target in the second image, the skeleton information indicating a skeleton of the target based on the second image, the statistical model is generated in advance by learning from third images of the region of the target, the received data is collected based on a reflected wave by a part of the antennas, the part of the antennas being set based on the first instruction information when the first instruction information is generated, and the security inspection is performed for a part of the first image, the part of the first image being set based on the second instruction information when the second instruction information is generated.

2. The security inspection system according to claim 1, wherein the hardware processor is configured to generate the first image corresponding to a part of the target when the second instruction information is generated.

3. The security inspection system according to claim 1, wherein the hardware processor is configured to use the statistical model to which at least one of a region of the target and index information allocated to a part of the antennas is input together with the first image.

4. The security inspection system according to claim 1, wherein the position of the region of the target in the second image included in the region information is represented by a first coordinate value defined in the first image.

5. The security inspection system according to claim 4, wherein the hardware processor is configured to convert the first coordinate value representing the position of the region of the target in the second image into a second coordinate value representing a position of the region of the target in a real space, and generate the at least one of the first instruction information and the second instruction information based on the second coordinate value.

6. The security inspection system according to claim 1, wherein the hardware processor is configured to generate, as the first instruction information, information that designates an antenna that transmits a radio wave corresponding to the region of the target and an antenna that receives a reflected wave from the region.

7. The security inspection system according to claim 5, wherein the hardware processor is configured to generate, as the second instruction information, information designating an area including the region of the target as an area for which the security inspection is to be performed.

8. The security inspection system according to claim 1, wherein the hardware processor is configured to output a result of the security inspection.

9. The security inspection system according to claim 8, wherein the hardware processor is configured to display a result of the security inspection or issue an alarm based on the result of the security inspection.

10. The security inspection system according to claim 9, wherein:

the result of the security inspection includes whether the target is carrying a predetermined object, and the hardware processor is configured to display text or a mark indicating that the target is carrying the predetermined object when a result of the security inspection indicating that the target is carrying the predetermined object is acquired, or issue an alarm when a result of the security inspection indicating that the target is carrying a predetermined object is acquired.

11. The security inspection system according to claim 1, wherein the hardware processor is configured to:

put a region of the target on the first image as a label; and cause the statistical model to learn using the first image on which the label is put.

12. The security inspection system according to claim 11, wherein the label put on the first image includes index information allocated to a part of the antennas, the part of the antennas being set based on the region information.

13. The security inspection system according to claim 1, wherein:

the hardware processor is configured to acquire a plurality of pieces of region information regarding a plurality of regions of the target, and the at least one of the first instruction information and the second instruction information is generated based on the plurality of pieces of region information.

* * * * *